(12) United States Patent  (10) Patent No.: US 7,774,108 B2
Nakasako et al.  (45) Date of Patent: Aug. 10, 2010

(54) FRONT AND REAR WHEEL DRIVE VEHICLE

(75) Inventors: Tooru Nakasako, Saitama (JP);
Kazuhiko Kitano, Saitama (JP);
Toshihiko Fukuda, Saitama (JP);
Takahiro Yonekura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/651,098

(22) Filed: Aug. 29, 2003

(65) Prior Publication Data
US 2004/0099459 A1 May 27, 2004

Related U.S. Application Data (63) Continuation-in-part of application No. 09/987,036, filed on Nov. 13, 2001, now abandoned.

(30) Foreign Application Priority Data

Nov. 14, 2000 (JP) ............................. 2000-346569

(51) Int. Cl.
*B60K 1/00* (2006.01)
*G06F 19/00* (2006.01)
(52) U.S. Cl. ............. 701/22; 180/165; 180/65.21; 180/65.26
(58) Field of Classification Search ............. 701/53, 701/93, 22, 51, 54, 99, 101, 102; 180/248, 180/197, 65.2, 65.3, 165, 65.1, 65.21, 65.26; 318/139, 448
See application file for complete search history.

(56) References Cited

U.S. PATENT DOCUMENTS

| 5,495,906 | A | | 3/1996 | Furutani ..................... 180/65.2 |
| 5,811,957 | A | * | 9/1998 | Bose et al. .................. 318/802 |
| 5,839,535 | A | | 11/1998 | Arai ............................ 80/197 |
| 6,051,941 | A | * | 4/2000 | Sudhoff et al. .............. 318/140 |
| 6,125,314 | A | * | 9/2000 | Graf et al. ..................... 701/53 |
| 6,198,256 | B1 | * | 3/2001 | Miyazaki et al. .............. 322/16 |
| 6,205,379 | B1 | * | 3/2001 | Morisawa et al. ............ 701/22 |
| 6,330,498 | B2 | * | 12/2001 | Tamagawa et al. ........... 701/22 |
| 6,338,391 | B1 | * | 1/2002 | Severinsky et al. ......... 180/65.2 |
| 6,401,016 | B1 | * | 6/2002 | Yoshino et al. .............. 701/22 |
| 6,755,266 | B2 | * | 6/2004 | Lasson ..................... 180/65.4 |
| 6,809,429 | B1 | * | 10/2004 | Frank ........................ 290/40 C |
| 2001/0015299 | A1 | | 8/2001 | Moore ........................ 180/243 |
| 2001/0017225 | A1 | | 8/2001 | Yamamoto et al. ........ 180/65.2 |
| 2001/0042649 | A1 | | 11/2001 | Maeda et al. .............. 180/65.4 |

FOREIGN PATENT DOCUMENTS

JP 404243627 8/1992

* cited by examiner

*Primary Examiner*—Khoi Tran
*Assistant Examiner*—Ronnie Mancho
(74) *Attorney, Agent, or Firm*—Arent Fox LLP (57) ABSTRACT

A front and rear wheel drive vehicle having a front wheel pair and a rear wheel pair, one of which is driven with an engine and the other one of which is driven with a motor. The vehicle includes an engine driving force setting section which sets a target driving force of the engine based on driving conditions of the vehicle, a motor driving force setting section which sets a target driving force of the motor based on driving conditions of the vehicle and a control section of the motor in accordance with changes of the target engine driving force and the target motor driving force.

4 Claims, 9 Drawing Sheets

(a) ENGINE

----- COMMAND VALUE
——— ACTUAL VALUE

ELAPSED TIME (b) MOTOR

----- COMMAND VALUE
——— ACTUAL VALUE

ELAPSED TIME

FRONT AND REAR WHEEL DRIVE VEHICLE

CROSS-REFERENCE TO RELATED APPLICATION

This is a Continuation in Part of application Ser. No. 09/987,036, filed Nov. 13, 2001 and now abandoned.

FIELD OF THE INVENTION

The present invention relates to front and rear wheel drive vehicles wherein a front wheel pair and a rear wheel pair are driven, respectively, and more particularly, to a front and rear wheel drive vehicle wherein one of front and rear wheel pairs is driven with an engine and the other one of the front and rear wheel pairs is driven with a motor.

BACKGROUND OF THE INVENTION

Front and rear wheel drive vehicles are generally known, in which both front and rear wheel pairs of the vehicle are driven to improve running through performance of the vehicle. Conventionally, these front and rear wheel drive vehicles are classified into part time four wheel drive type vehicles and full time four wheel drive type vehicles in accordance with the type of driven wheel. In the part time four wheel drive type, the vehicle is switched between four wheel drive and two wheel drive in response to the road conditions and driving conditions, and when the vehicle is in a bad road condition or on a steep slope, the vehicle runs with the front and rear wheels driven, and when the vehicle is in a good road condition, the vehicle runs with two wheels driven to improve the fuel economy.

However, in this part time four wheel drive type, since the driving force is divided from the engine as a power plant into the front wheels and the rear wheels, a complicated and expensive power transmission device is required.

In view of the foregoing drawbacks of the prior art, the applicants have repeated considerable research and development works to provide a hybrid-type front and rear wheel drive vehicle, wherein a front wheel pair and a rear wheel pair are driven with different power units, i.e. one of the front and rear wheel pairs is driven with an engine and the other one of the front and rear wheel pairs is driven with a motor having the same output with the engine, and wherein a traction and a slip and further fuel consumption are controlled in such a manner that control signals outputted from the controller control the actuation, stop or the drive of the engine and the motor.

Specifically, the vehicle speed is detected and the rear wheel slip ratio is obtained based on the average rotational speed of the right and left and front and rear wheels and the vehicle speed, and subsequently the control mode of the vehicle is determined based on the shift position, on/off of the accelerator, the opening degree of the accelerator pedal and the driving condition of the vehicle.

For example, when the accelerator pedal is on and the advance acceleration is outputted from an acceleration sensor, an advance driving mode is determined, and when the rearward acceleration is outputted from the acceleration sensor, a rearward driving mode is determined.

ECU composed of a microcomputer comprises a fixed memory such as RAM (Random Access Memory) or ROM (Read Only Memory), and driving force distribution control programs for determining the driving force distribution ratio of the engine and the motor and at least a program considering fuel consumption and a program considering running through performance are stored in the fixed memory so that a suitable program is selected in accordance with the driving mode.

In this event, consideration is made to the above driving force distribution control programs so that the driving condition is determined from the accelerator opening degree, the vehicle speed and the like, and based on this driving condition the driving force command values of the engine and the motor are determined with respect to the demand driving force required for the present driving condition, and subsequently when the driving force command values are outputted to the engine and the motor, these values are modified to values associated with the actual driving force and thereafter outputted to the output control sections of the engine and the motor.

Figure 9:
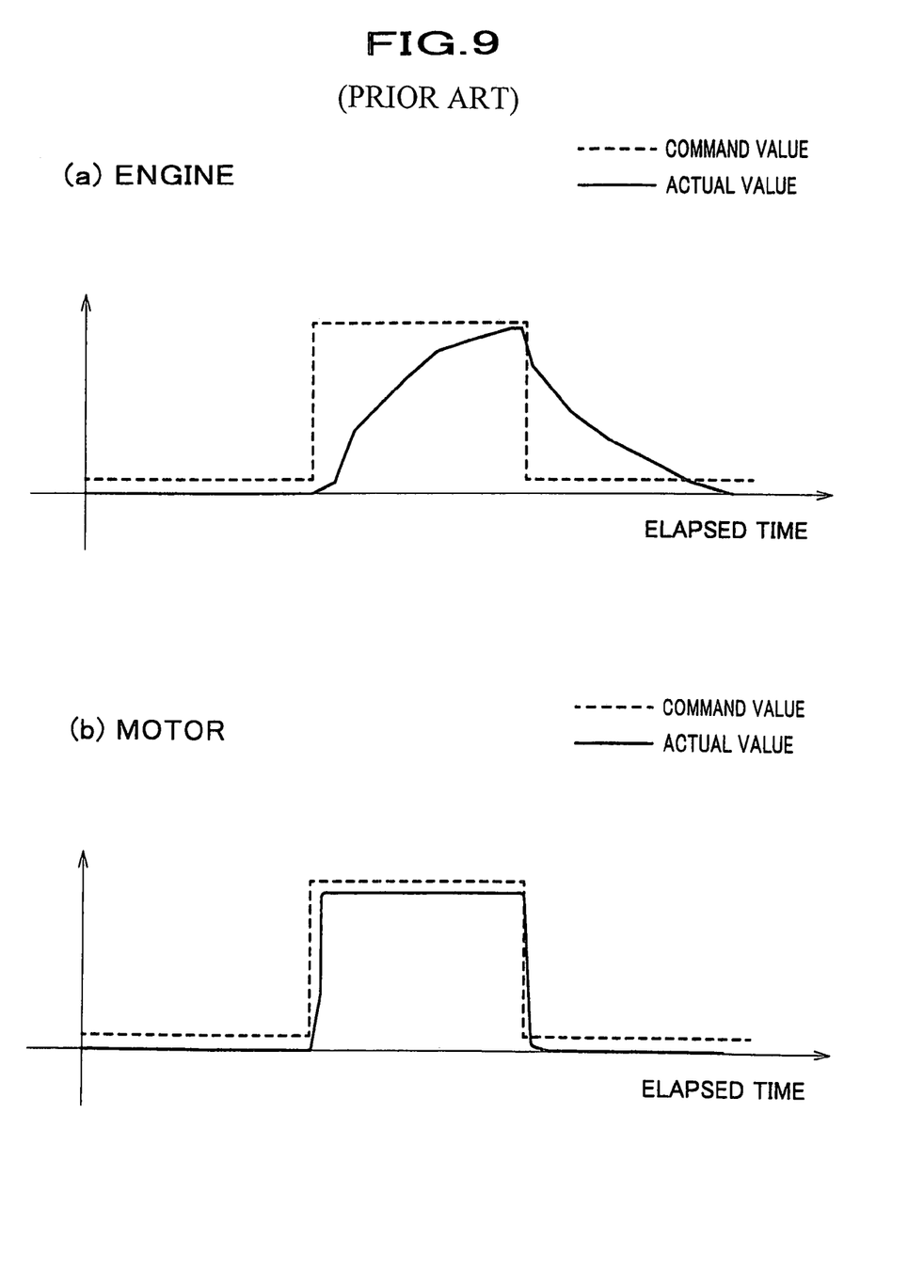
FIG. 9 shows a difference in time constant between the engine and the motor, wherein (a) is a graph illustrating response characteristic of the engine, and (b) is a graph illustrating response characteristic of the motor.

However, as shown in FIG. 9, the engine and the motor are different in change of the actual driving force ratio after the driving force command value is outputted and before reaching to the maximum output, and as a result, the engine and the motor are considerably different in terms of the time constant up to the maximum transitional period. For this reason, a torque slippage arises due to a temporal decrement of the rotating torque of the motor for example when the regeneration mode is carried out to charge the battery under the command of the battery remaining amount sensor during the front and rear wheel driven mode at which the engine and the motor are driven simultaneously, and when the target driving force of the engine increases with respect to the target driving force of the motor for the purpose of fuel-saving drive and the driving ratio of the engine increases as the result.

As mentioned above, according to the hybrid-type front and rear wheel drive vehicle independently controlling the engine and the motor, a shock arises due to torque slippage or excess torque when one driving force command value of the engine or the motor decreases with respect to the other driving force of the motor or the engine and a large torque gap arises.

In order to prevent the shock, the time constant of the motor associated with the transitional period from the minimum target driving force to the maximum target driving force may be always as large as that of the engine, and the command value of the motor may be filtered with a delayed filter having the same level time constant with the engine, viz. a delayed filtering process may be carried out so that the time constant of the motor is substantially the same as that of the engine. However, this leads to a loss of the excellent feeling of the motor with excellent response, and as the result, the advantages of the hybrid-type front and rear wheel drive vehicle are lost.

Accordingly, the object of the present invention is to solve the drawbacks, such as shock derived from torque slippage or excess torque resulting from differences of the time constant between the engine and the motor, in the front and rear wheel drive vehicle wherein one of front and rear wheel pairs is driven with the engine and the other one of the front and rear wheel pairs is driven with the motor.

SUMMARY OF THE INVENTION

According to a first aspect of the present invention, a delayed filtering process is carried out only in the case where one of the garget engine driving force and the target motor driving force increases and the other one of the target motor driving force and the target engine driving force decreases.

In other words, according to the first aspect of the present invention, there is provided a front and rear wheel drive vehicle having a front wheel pair and a rear wheel pair, one of which is driven with an engine and the other one of which is driven with a motor, comprising: a target engine driving force setting means which sets a target engine driving force based on driving conditions of the vehicle; a target motor driving force setting means which sets a target motor driving force based on driving conditions of the vehicle; and a control means which applies a delayed filtering process to the motor in accordance with changes of the target engine driving force and the target motor driving force, wherein in a case where one of the target engine driving force and the target motor driving force increases and the other one of the target motor driving force and the target engine driving force decreases, the control means applies the delayed filtering process to the motor, and in other cases, the control means does not apply the delayed filtering process to the motor.

The delayed filtering process may be carried out, such as by changing a time constant of the motor. As shown in FIGS. 9A and 9B, the actual driving force of the motor typically responds much quicker to a change in the target driving force of the motor than the actual driving force of the engine responds with respect to a change in the target driving force of the engine, The time it takes for the motor to transition from a lower target driving force to a higher target driving force, or vice versa, is the time constant of the motor. The time it takes for the engine to transition from a lower target driving force to a higher target driving force, or vice versa, is the time constant of the engine. Under certain conditions, as described subsequently in greater detail, a control means may delay the more rapid response of the motor in relation to the engine by incrementally commanding the motor to achieve a plurality of driving force values on the way toward achieving the target value.

In the front and rear wheel drive vehicle wherein the engine and the motor are controlled independently, when a front wheel pair and a rear wheel pair are driven, a large torque gap may arise if one of the motor driving force command value and the engine driving force command value decreases with respect to the other, leading to a torque slippage or an excess torque. However, in the aforementioned front and rear wheel drive vehicle, it is possible to prevent a shock derived from a torque difference between the engine and the motor, thereby improving a response as a vehicle. This is because the target engine driving force setting means obtains a target driving force of the engine based on driving conditions of the vehicle, a target motor driving force setting means obtains a target driving force of the motor based on driving conditions of the vehicle, and a control means applies a delayed filtering process to the motor only in the case where one of the target engine driving force and the target motor driving force increases and the other one of the target motor driving force and the target engine driving force decreases.

According to a second aspect of the present invention, the motor driving force command value is corrected only in the case where one of the target engine driving force and the target motor driving force increases and the other one of the target motor driving force and the target engine driving force decreases.

In other words, according to the second aspect of the present invention, there is provided a front and rear wheel drive vehicle having a front wheel pair and a rear wheel pair, one of which is driven with an engine and the other one of which is driven with a motor, comprising: a target engine driving force setting means which sets a target engine driving force based on driving conditions of the vehicle; a target motor driving force setting means which sets a target motor driving force based on driving conditions of the vehicle; and a control means which corrects a motor driving force command value that is outputted in plural times in accordance with a change amount of the target motor driving force, wherein in a case where one of the target engine driving force and the target motor driving force increases and the other one of the target motor driving force and the target engine driving force decreases, the control means corrects the motor driving force command value, and in other cases, the control means does not correct the motor driving force command value.

In the instance where increment or decrement of said target driving forces do not express the same trend, a driving force of said motor may be controlled in such a manner that a change amount of said motor driving force command value with respect to a change amount of said target driving force of the motor is regarded as a certain amount based on a change amount of said engine driving force command value with respect to a change amount of the target driving force of the engine.

In this front and rear wheel drive vehicle, a shock derived from a torque difference between the engine and the motor is restricted and a smooth front and rear wheel driven drive is achieved, because the control means corrects the motor driving force command value only in the case where one of the target engine driving force and the target motor driving force increases and the other one of the target motor driving force and the target engine driving force decreases.

BRIEF DESCRIPTION OF THE DRAWINGS

Preferred embodiments of the present invention will be described below, by way of example only, with reference to the accompanying drawings, in which:

FIG. 7 shows calculation processes of a slope drive control step value utilized for the front and rear wheel driving force calculation program, wherein (a) is a graph illustrating changes of a target driving force of the engine and a target driving force of the motor before carrying out the slope control, (b) is a graph explaining a process for obtaining an engine slope control step value by way of dividing the target driving force of the engine by a sampling interval based on a time constant of the engine, and a process for obtaining a motor slope control step value by way of dividing the target driving force of the motor by a sampling interval based on a time constant of the motor, (c) is a graph explaining a process for applying the engine slope control step value to the motor, and (d) is a graph explaining a control process for adding control values with respect to the preceding driving force command values of the engine and the motor.

DESCRIPTION OF THE PREFERRED EMBODIMENT

With reference to FIGS. 1 to 8, one preferred embodiment of the present invention will be described. In this preferred embodiment, a delayed filtering process is applied to a motor in accordance with an increase/decrease in a target engine driving force and a target motor driving force.

Figure 1:
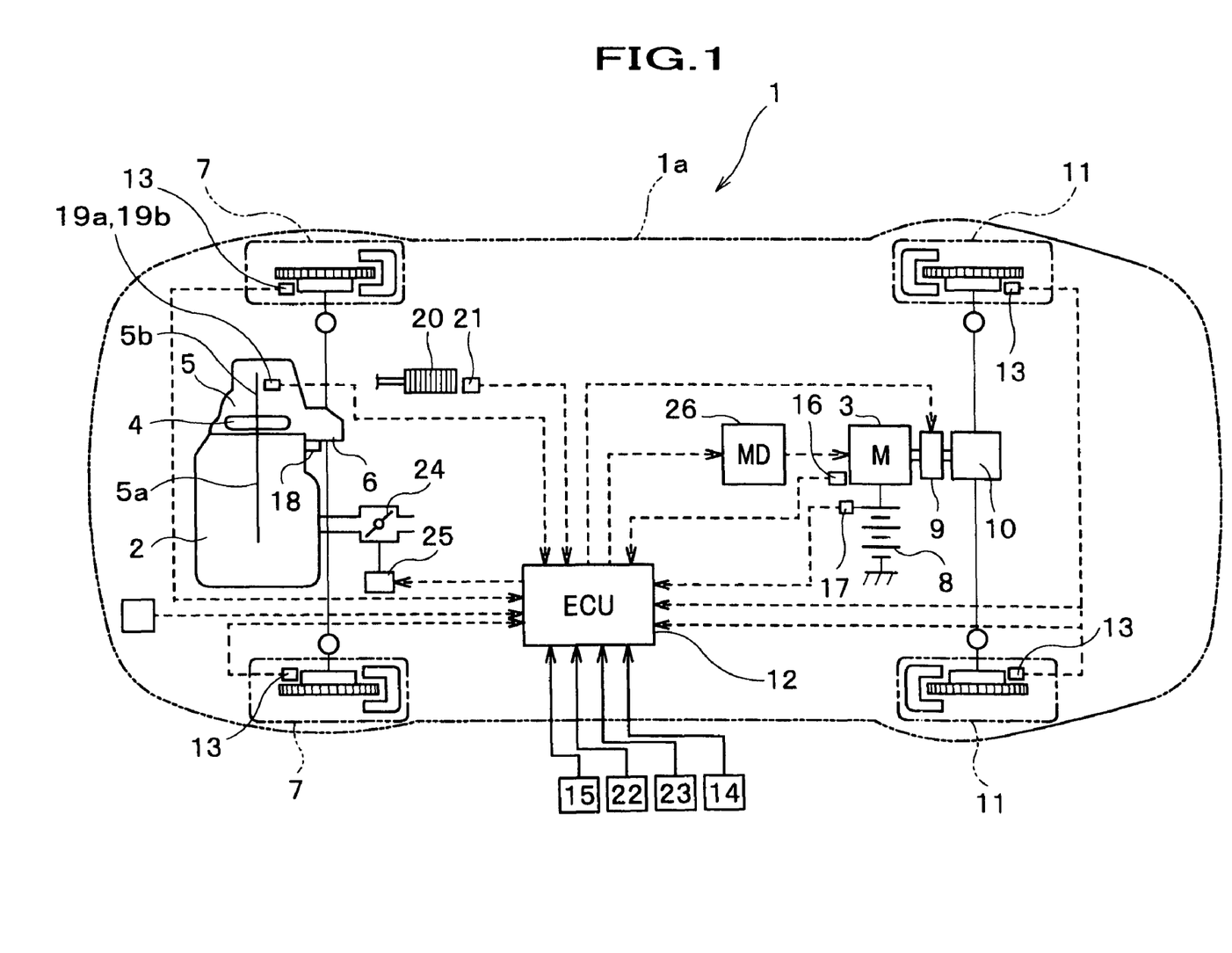
FIG. 1 is an explanatory view illustrating an overall structure of a front and rear wheel drive vehicle according to the present invention.

FIG. 1 shows a hybrid-type four wheel drive vehicle as an example of a front and rear wheel drive vehicle. As shown in the drawing, this hybrid-type four wheel drive vehicle (hereinafter referred to as a vehicle) 1 is equipped with an engine 2 and a motor 3 as power plants for driving.

The engine 2 is laterally mounted on a front area of the vehicle 1. In addition, the engine 2 is coupled to the front wheels 7, 7 through an automatic power transmission 5 with a torque converter 4 and a front differential 6. Further, the motor 3 is electrically coupled to a battery 8 as a drive source and is mechanically coupled to the rear wheels 11, 11 through a clutch 9 and a rear differential 10.

The vehicle 1 is provided with various sensors for detecting driving conditions of the vehicle 1 and ECU (control means) 12 for controlling the engine 2, the motor 3 and the clutch 9 on the basis of detection signals of the sensors.

In order to detect driving conditions of the vehicle 1, wheel rotation speed sensors 13, an acceleration sensor 14 and a vehicle angle sensor 15 are attached to the vehicle body 1a. The wheel rotation speed sensors 13 are attached to the vehicle body 1a as pick-ups for detecting the vehicle speed on the basis of rotation speeds of the front wheel pair 7, 7 and the rear wheel pair 11, 11. The acceleration sensor 14 determines whether the vehicle 1 runs in the advance direction or in the reverse direction based on the acceleration of the vehicle 1 to be detected and its calculation result. The vehicle angle sensor 15 detects the vehicle angle (inclination angle) of the vehicle body 1a with respect to the horizontal plane.

In addition, a motor rotation speed sensor 16 is mounted to the motor 3 to detect a rotation speed of the motor 3. A battery remaining amount sensor 17 is mounted to the battery 8 to detect a remaining amount of the battery 8 for the regenerative operation. A crank angle sensor 18 is mounted to the engine 2 to detect a crank angle. And rotation speed sensors 19a, 19b are mounted to detect a rotation speed of a main shaft 5a of the automatic transmission 5 and a rotation speed of a counter shaft 5b of the automatic transmission 5, respectively.

Further, an accelerator opening sensor 21 is coupled to an accelerator pedal 20 to detect an accelerator opening degree including ON/OFF of the accelerator pedal 20. A brake pressure sensor 22 is attached to a master cylinder (not shown) of a brake pedal to detect a brake pressure. And a shift position detection sensor 23 is mounted to a shift device (not shown) to detect a shifting position.

Figure 2:
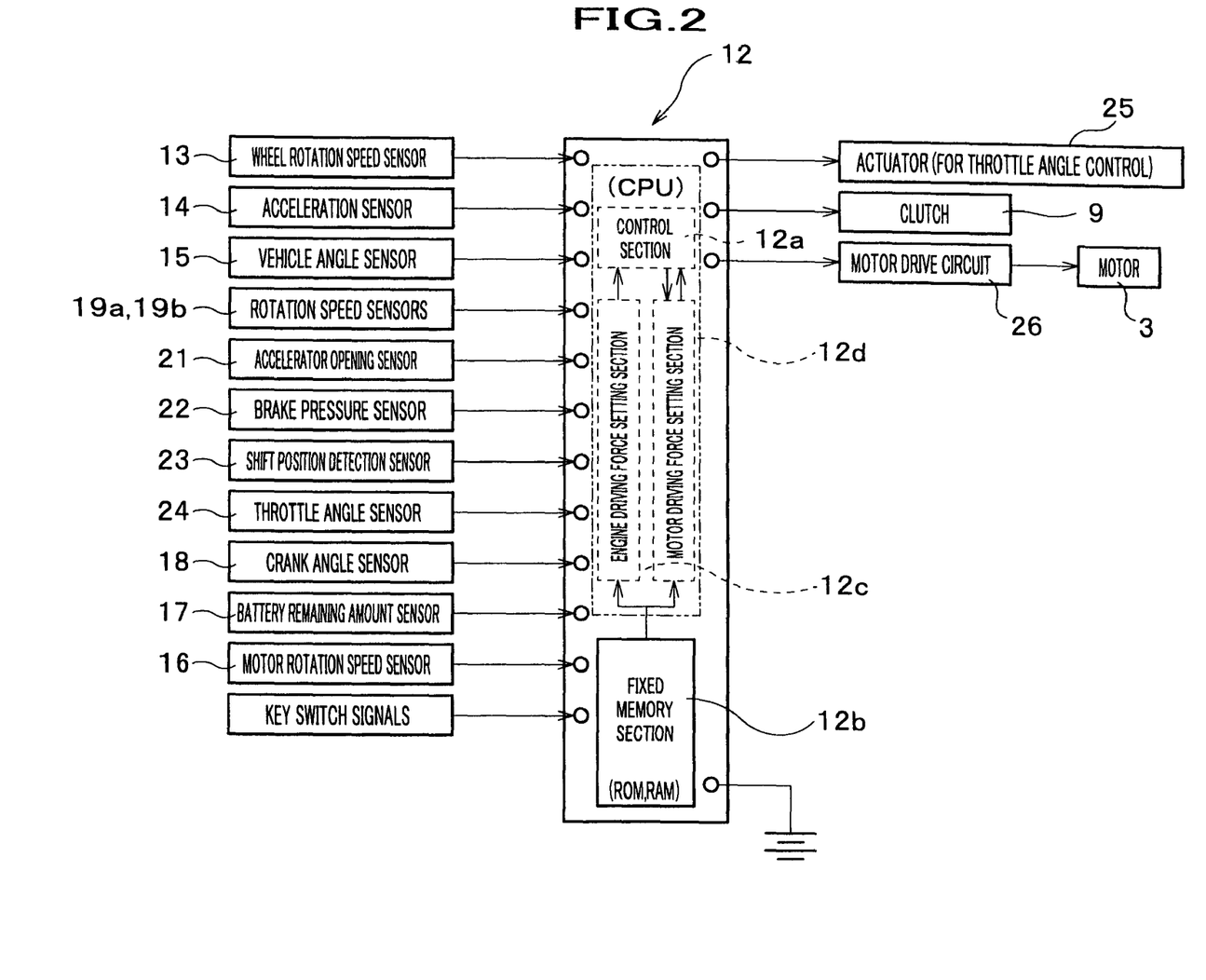
FIG. 2 is a block diagram illustrating a constitution of ECU and relations between ECU, sensors and a control system of the front and rear wheel drive vehicle.

ECU 12 is composed of an electric control circuit or a microcomputer including a RAM (Random Access Memory), a ROM (Read Only Memory), a CPU (Central Processing Unit) or MPU (Micro Processing Unit) and I/O interfaces, etc. As shown in FIG. 2, ECU 12 comprises a control section 12a, a fixed memory section 12b, an engine driving force setting section 12c and a motor driving force setting section 12d.

In order to detect driving conditions of the vehicle, ECU is connected to various sensors, such as the wheel rotation speed sensors 13, the acceleration sensor 14, the vehicle angle sensor 15, the motor rotation speed sensor 16, the battery remaining amount sensor 17, the crank angle sensor 18, the rotation speed sensors 19a, 19b, the accelerator opening sensor 21, the brake pressure sensor 22, and the shift position detection sensor 23. Also, in order to carry out a control on the basis of these detected datum, a throttle angle sensor 24, an actuator 25, a drive circuit (not shown) of the clutch 9, a motor drive circuit 26 and the like are connected to ECU 12.

Figure 5:
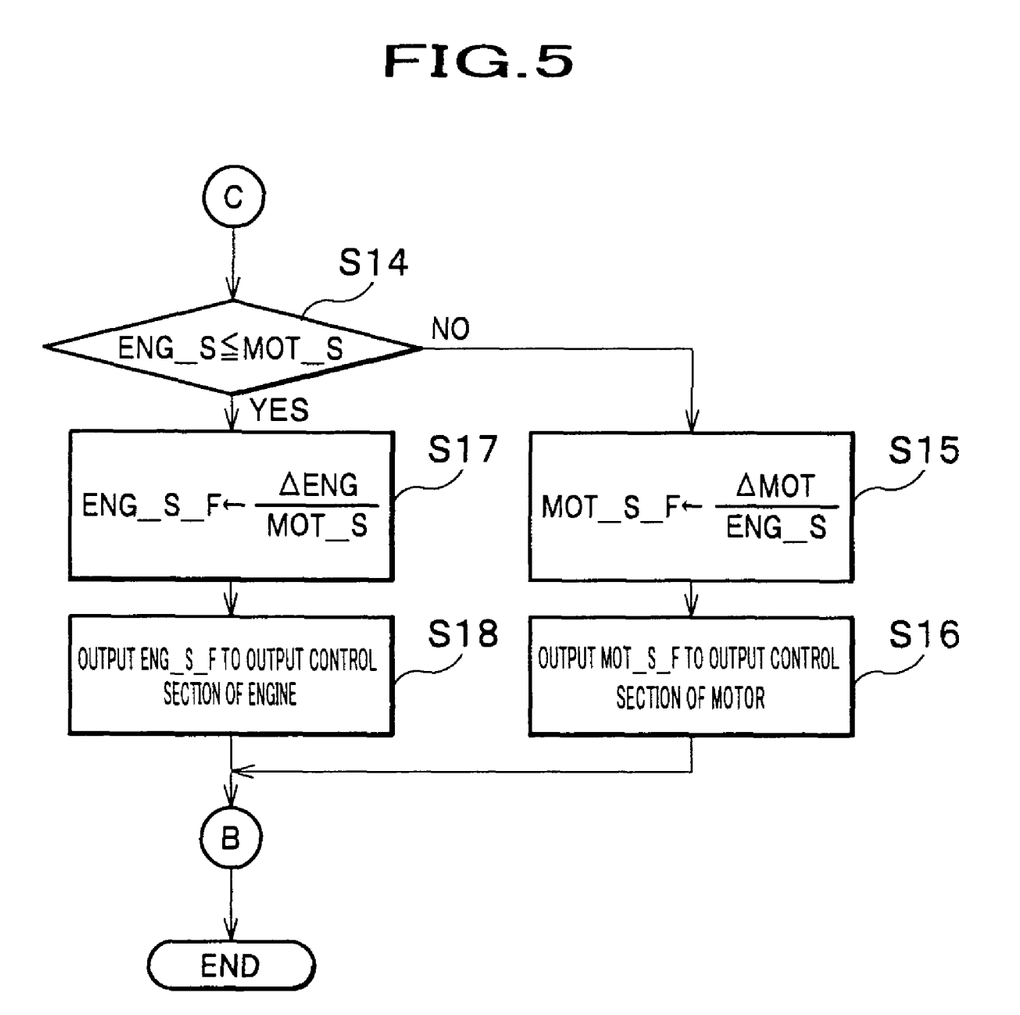
FIG. 5 is a flow chart explaining a slope control of the engine and the motor of the front and rear wheel drive vehicle.
Figure 6:
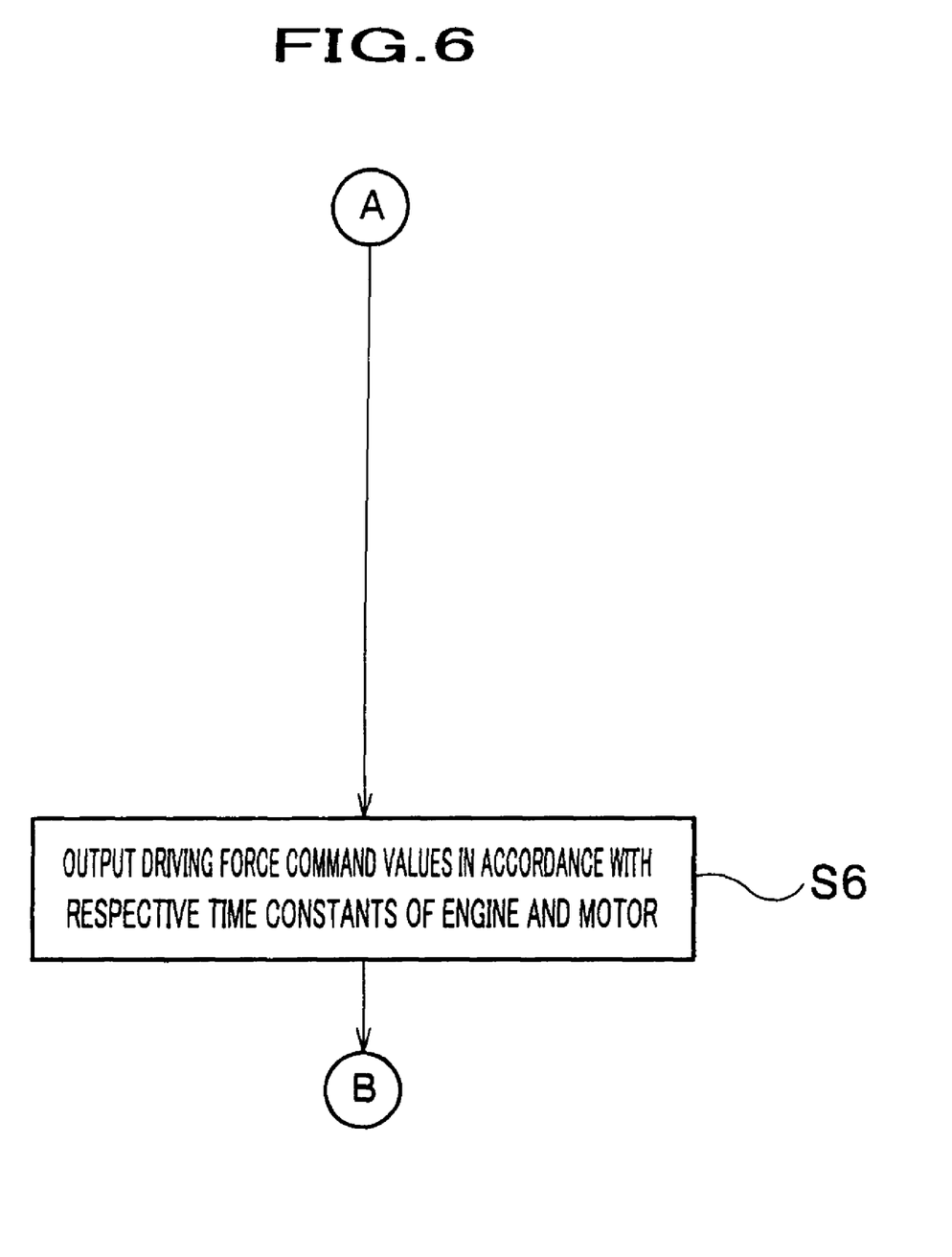
FIG. 6 is a flow chart explaining a slope control of the engine and the motor of the front and rear wheel drive vehicle.
Figure 7:
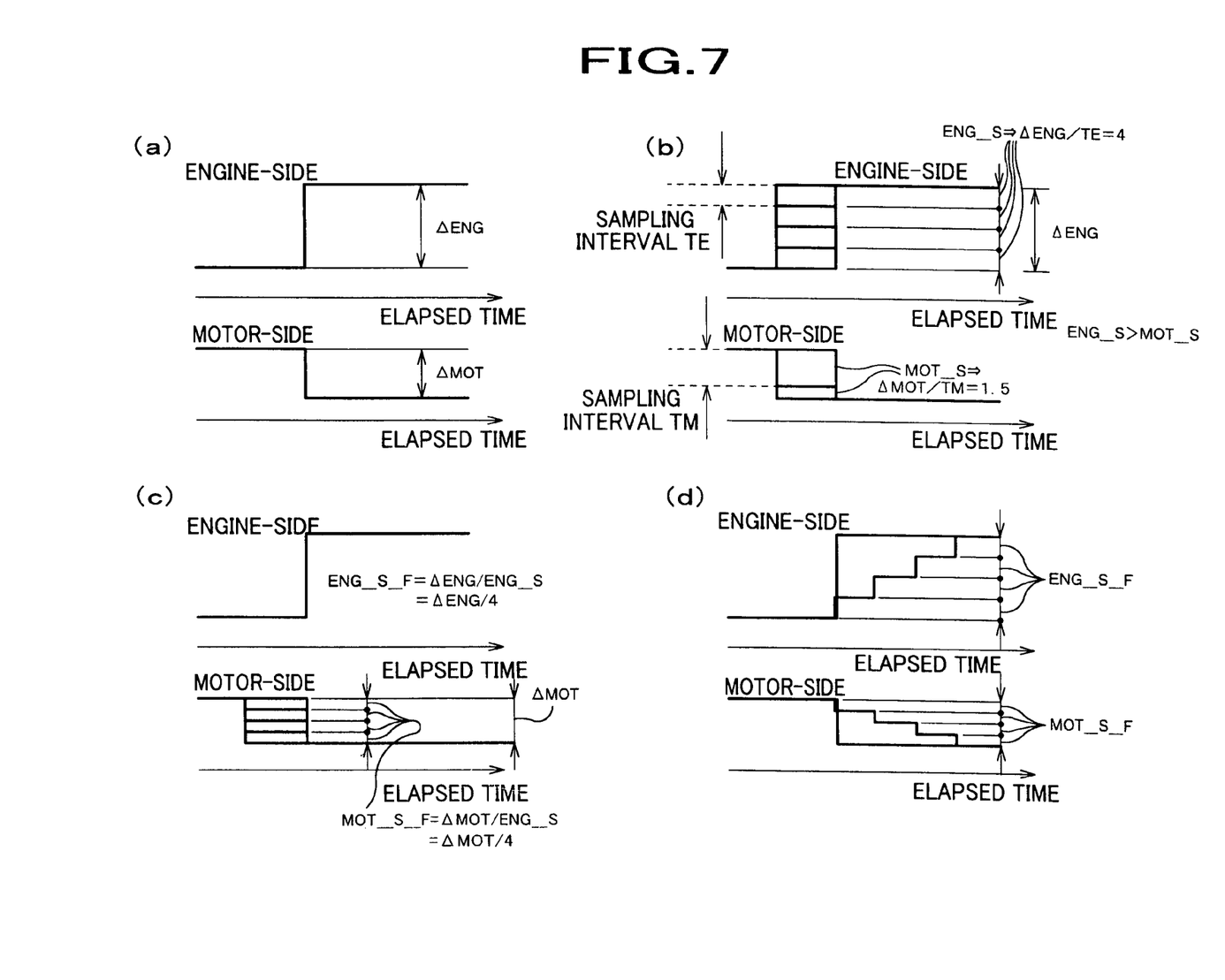
Figure 8:
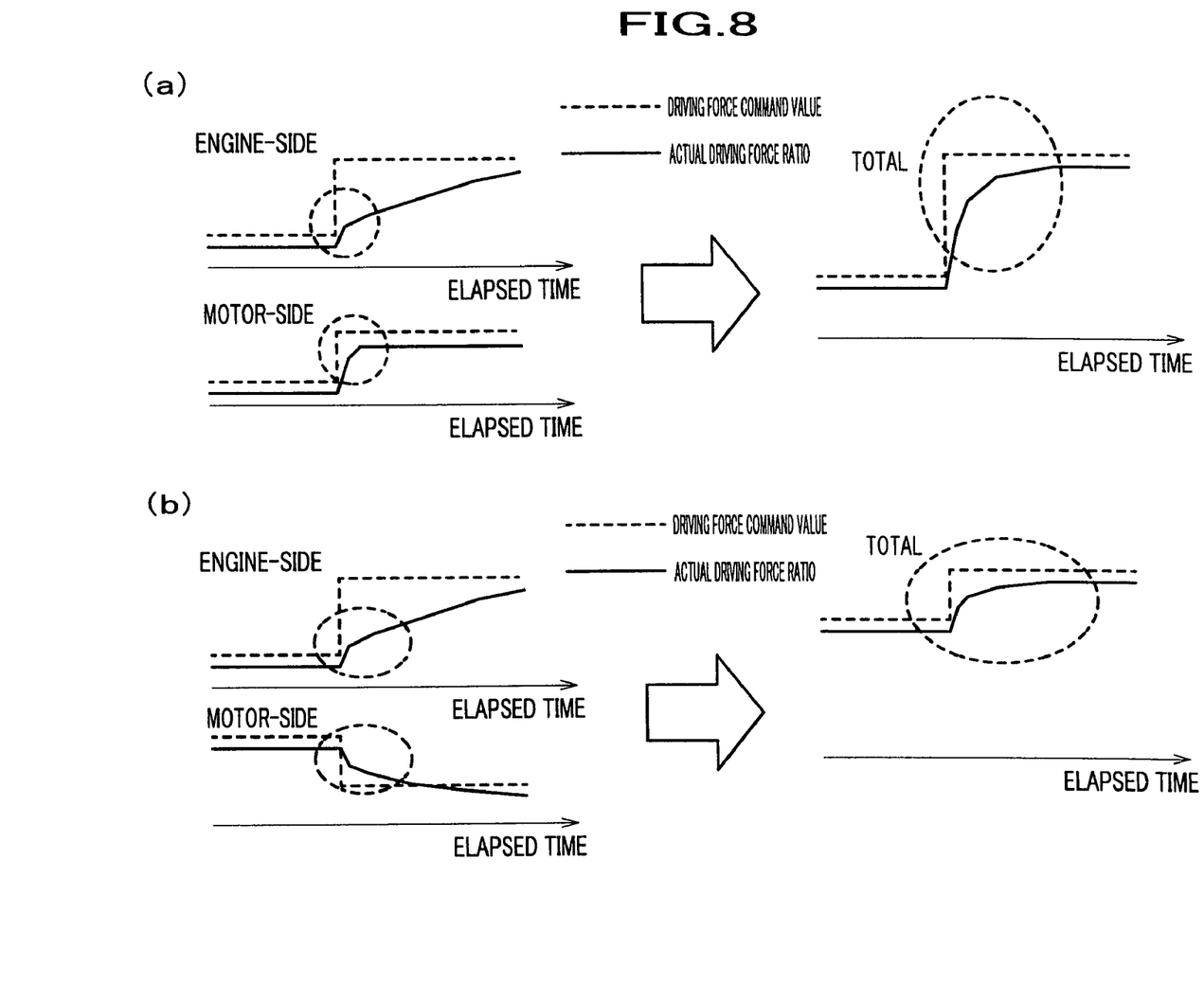
FIG. 8 shows control states based on the motor slope control step of the front and rear wheel drive vehicle, wherein (a) is a graph illustrating the total driving force of the respective driving forces of the engine and the motor in an instance where an engine driving force command value and a motor driving force command value are both increasing, and (b) is a graph illustrating the total driving force of the respective driving forces in an instance where either the engine driving force command value or the motor driving force command value is increasing while the other is decreasing.

FIGS. 3 to 6 show flow charts of a front and rear wheel driving force calculation program in a case where the front wheel pair and the rear wheel pair are driven, and FIGS. 7 and 8 show calculation processes of a slope drive control step value utilized for the front and rear wheel driving force calculation program. The front and rear wheel driving force calculation program is actuated in a certain period of time (for example 10 msec) when the front wheel pair and the rear wheel pair are driven.

Figure 3:
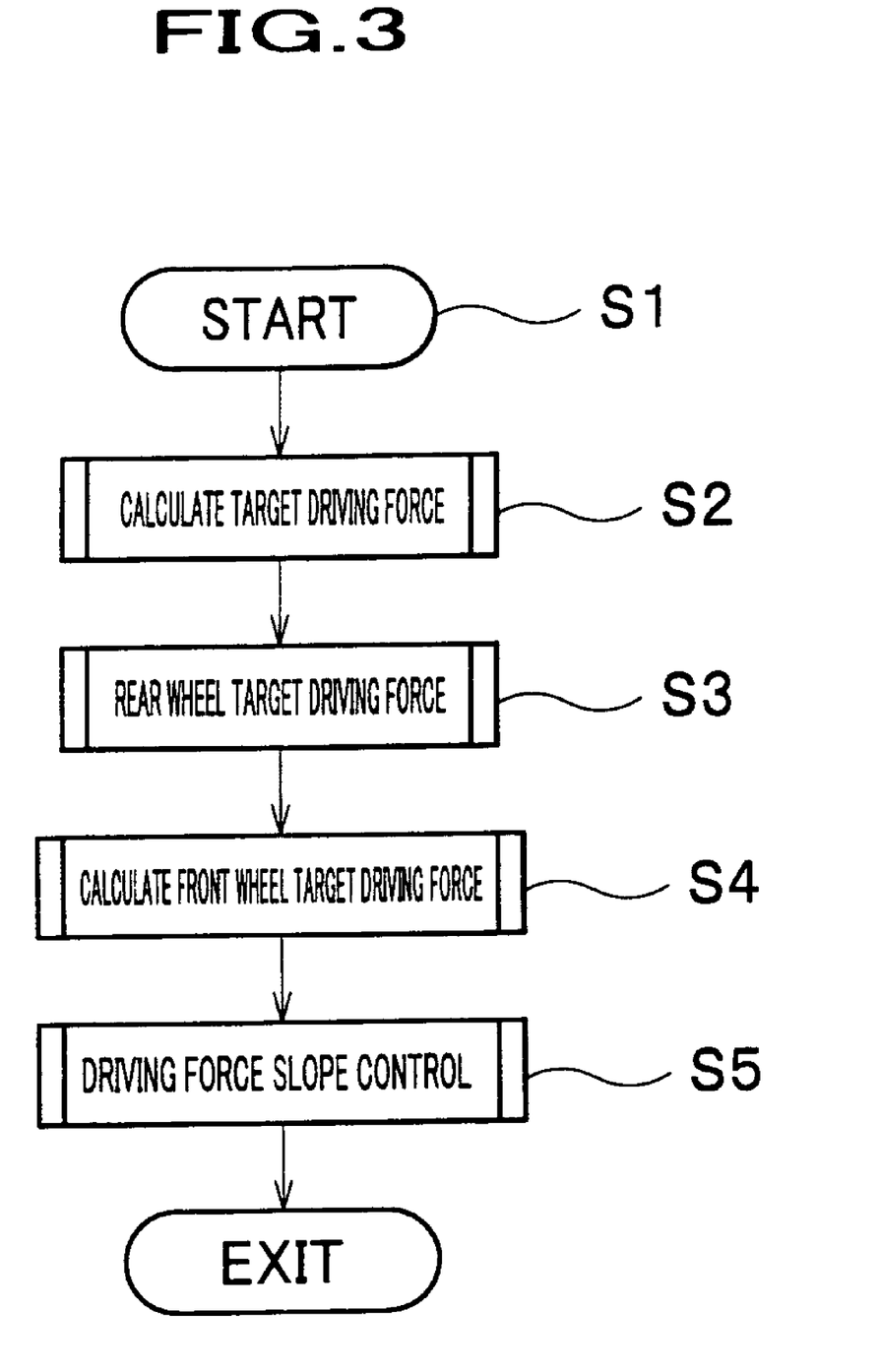
FIG. 3 is a flow chart explaining a front and rear wheel driving force calculation program in a case where a front wheel pair and a rear wheel pair of the front and rear wheel drive vehicle are driven.

As shown in FIG. 3, ECU 12 starts to control the driving force (Step S1) when switched to the front and rear wheel driven mode. The control section 12a first reads the control datum, such as a control program, a map and a table for the front and rear wheel driven mode, which are stored in the fixed memory section 12b, and then calculates a current target driving force of the vehicle 1 (hereinafter referred to as a vehicle target driving force) (Step S2).

The vehicle target driving force is calculated on the basis of vertical loads applied to the front wheels 7, 7 and the rear wheels 11, 11, a coefficient of friction μ of the road surface, an inclination angle of the road surface, driving radii of the front wheels 7, 7 and the rear wheels 11, 11, an output value of the accelerator opening sensor 21, and output values of the wheel rotation speed sensors 13 and the acceleration sensor 14. Herein, the vertical loads of the front wheels 7, 7 and the rear wheels 11, 11 are calculated from a measured value that is previously measured on a flat road surface and an inclination angle of the road surface and are updated for a certain time period. The coefficient of friction μ of the road surface is calculated on the basis of a driving force and a vertical load of each of the front wheels 7, 7 and the rear wheels 11, 11 at a time of slippage (viz. Coefficient of friction μ = Driving force of a slipping wheel/Vertical load, and Critical slip value of each wheel = Coefficient of friction μ of the road surface× Vertical load).

After the calculation of the vehicle target driving force, the motor driving force setting section 12d searches a two-dimensional map of vehicle angle and driving force distribution ratio, which is stored in the fixed memory section 12b, with the use of the actual inclination angle of the vehicle body, and then obtains the target driving force distribution ratio of the rear wheels 11, 11 with respect to the current inclination angle of the road surface. Subsequently, the vehicle target driving force is multiplied by the resulting target driving force distribution ratio to obtain the rear wheel target driving force (target driving force of the motor 3) (Step S3).

Next, the control section 12a calculates the front wheel target driving force (Step S4) by subtracting the rear wheel target driving force from the vehicle target driving force.

The control section 12a calculates the front wheel target driving force at Step S4. However, as seen in FIG. 2, the engine driving force setting section 12c may calculate the front wheel target driving force while calculating the rear wheel driving force of the motor driving force setting section 12d.

In this event, as mentioned above, the front wheel target driving force may be calculated by searching a two-dimensional map (not shown) of vehicle angle and driving force distribution ratio of the front and rear wheels, which is stored in the fixed memory section 12b, with the use of the actual inclination angle of the vehicle body to obtain the target driving force distribution ratio of the front wheels 7, 7 with respect to the current inclination angle of the road surface, and thereafter multiplying the resulting target driving force distribution ratio and the vehicle target driving force. Of course, the rear wheel target driving force may be calculated by subtracting the front wheel target driving force from the vehicle target driving force.

After calculating the vehicle driving force, the rear wheel target driving force (target driving force of the motor 3) and the front wheel target driving force (target driving force of the engine 2), a driving force slope control (Step S5) is carried out.

Figure 4:
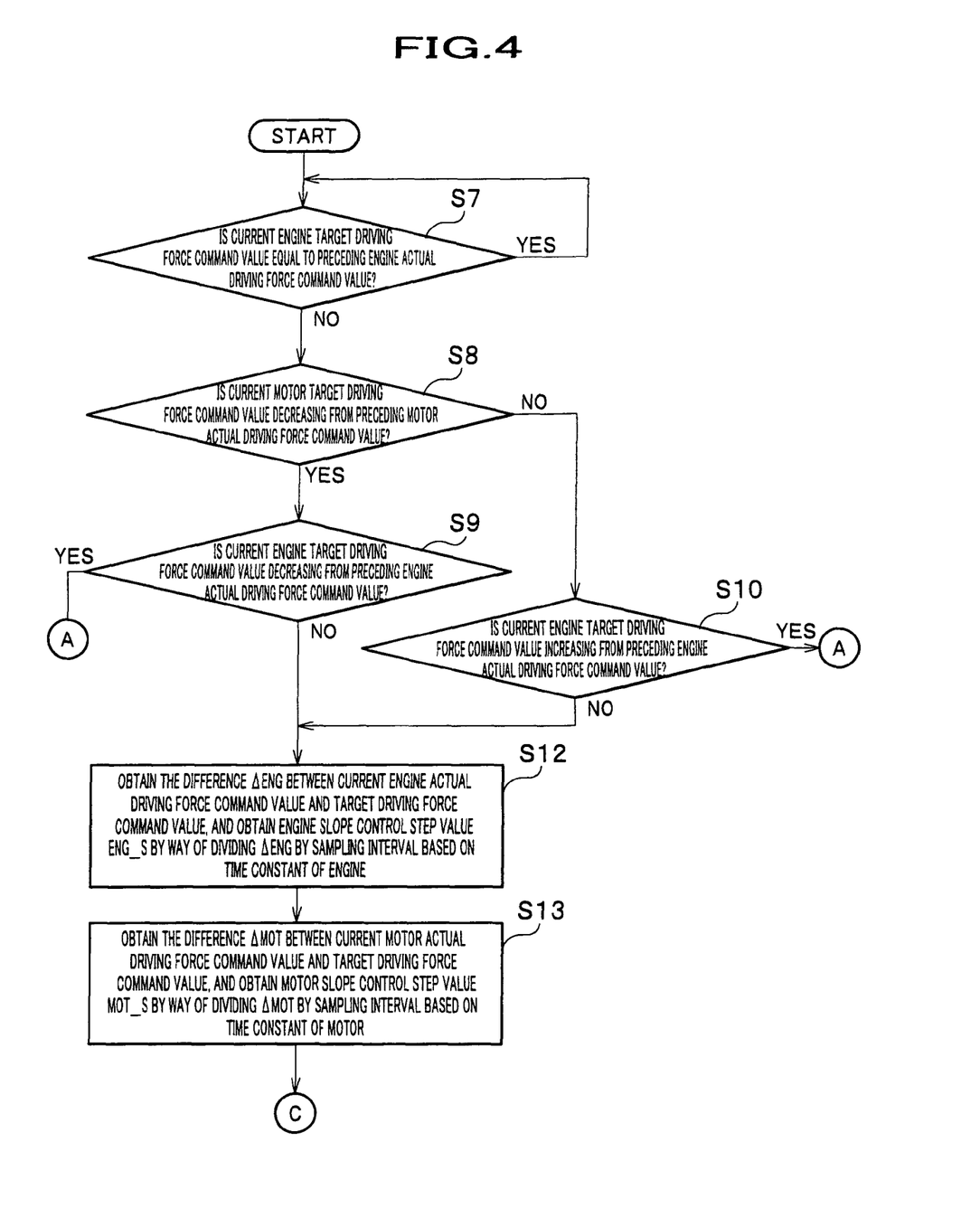
FIG. 4 is a flow chart explaining a slope control of the engine and the motor of the front and rear wheel drive vehicle.

FIGS. 4 to 6 show the slope control of driving force command values with respect to the engine 2 and the motor 3, FIG. 7 shows calculation processes of a slope drive control step value utilized for the front and rear wheel driving force calculation program of the vehicle 1, and FIG. 8 shows differences of the control in accordance with the motor slope control step of the front and rear wheel drive vehicle.

The delayed filtering process will now be described. In FIG. 7, (a) illustrates changes of a target driving force of the engine 2 and a target driving force of the motor 3 before carrying out the slope control, and (b) illustrates a process for obtaining an engine slope control step value by way of dividing the target driving force of the engine 2 by a sampling interval TE based on a time constant of the engine 2, and a process for obtaining a motor slope control step value by way of dividing the target driving force of the motor 3 by a sampling interval TM based on a time constant of the motor 3.

Also, in FIG. 7, (c) illustrates a process for applying the engine slope control step value to the motor, and (d) illustrates a control process for adding control values with respect to the preceding driving force command values of the engine and the motor.

In FIG. 8, (a) illustrates changes of the respective driving forces of the engine 2 and the motor 3 before and after synthesizing these driving forces in an instance where an engine driving force command value and a motor driving force command value are both increasing, and (b) illustrates changes of the respective driving forces of the engine 2 and the motor 3 before and after carrying out a slope control in an instance where either the engine driving force command value or the motor driving force command value is increasing while the other one is decreasing.

As shown in FIG. 4, when starting a slope control, a comparison is made between the preceding actual driving force command value (viz. the command value that is carried out by the preceding slope control) and the current target driving force command value.

Further, a determination is made as to whether the current engine target driving force command value is equal to the preceding engine actual driving force command value (Step S7), and if they are not equal, viz. there is a change, then a determination is made as to whether the motor target driving force command value is decreasing from the preceding motor actual driving force command value (Step S8). When the current motor target driving force command value is not decreasing from the preceding motor actual driving force command value at Step S8, that is when the current motor target driving force command value is increasing, then a determination is made as to whether the current engine target driving force command value is increasing from the preceding engine actual driving force command value (step S10).

When the current (present) motor target driving force command value is increasing from the preceding motor actual driving force command value at Step S8 and the current (present) engine target driving force command value is decreasing from the preceding engine actual driving force command value at Step S10, viz. in an instance where increment/decrement of the target driving force of the engine 2 and the target driving force of the motor 3 do not express the same trend, the difference between the preceding engine actual driving force command value and the current engine target driving force command value, that is the change amount $\Delta ENG$ of the target driving force of the engine 2, is calculated. Subsequently, as a change amount associated with a change amount of the engine driving force command value, this change amount $\Delta ENG$ is divided by the sampling interval TE based on the time constant of the engine 2 to thereby obtain the engine slope control step value ENG_S (FIG. 7(b), Step S12).

Next, the difference between the preceding motor actual driving force command value and the current motor target driving force command value, that is the change amount $\Delta MOT$ of the target driving force of the motor 2, is calculated. As a change amount associated with a change amount of the motor driving force command value, this change amount $\Delta MOT$ is divided by the sampling interval TM based on the time constant of the motor 3 to thereby obtain the motor slope control step value MOT_S (the number of steps of the motor driving force command value) (FIG. 7(b), Step S13).

Next, a comparison is made between the engine slope control step value ENG_S and the motor slope control step value MOT_S (Step S14).

When the engine slope control step value ENG_S is equal to or lower than the motor slope control step value MOT_S at Step S14, the change amount $\Delta ENG$ of the engine target driving force is divided by the motor slope control step value MOT_S to obtain a control value per one step, viz. a certain amount ENG_S_F on the basis of the change amount of the engine driving force command value associated with the change amount $\Delta ENG$ of the engine target driving force (FIG. 7(c), Step S17). Subsequently, this control value ENG_S_F is outputted to an output control section of the engine 2, that is the actuator 25 for actuating the throttle valve 24, and the control value ENG_S_F per one step is added in the order of sampling, so that the actual driving of the engine 2 approaches to the engine target driving force.

As a result, as seen in the graph (b) of FIG. 8, the driving force is changed smoothly as a whole vehicle and is changed excellently in terms of the response when in the front and rear wheel driven mode, thereby restricting an occurrence of a torque slippage or an excess torque of the front and rear wheel drive vehicle 1 derived from differences of the time constants with regard to the engine driving force command value and the motor driving force command value.

On the contrary, when the engine slope control step value ENG_S is over the motor slope control step value MOT_S, i.e., $\Delta ENG/TE > \Delta MOT/TM$, at Step S14, the change amount $\Delta MOT$ of the motor target driving force is divided by the engine slope control step value ENG_S, i.e., $\Delta MOT/(\Delta ENG/TE)$, to obtain a control value per one step, viz. a certain amount MOT_S_F on the basis of the change amount of the motor driving force command value associated with the change amount $\Delta MOT$ of the motor target driving force is obtained (Step S15). Subsequently, this control value MOT_S_F is outputted to the actuator 25 Step S16).

Accordingly, control values MOT_S_F per one step are added in the order of sampling, and as shown in FIG. 8, it is possible to prevent a shock of the front and rear wheel drive vehicle 1 derived from differences of the outputs between the engine 2 and the motor 3 and differences of the time constants between the engine 2 and the motor 3.

When the current motor target driving force command value is decreasing from the preceding motor actual driving force command value at Step S8 and the current engine target driving force command value is increasing from the preceding engine actual driving force command value at Step S9, viz. in an instance where increment/decrement of the target driving force of the engine 2 and the target driving force of the motor 3 do not express the same trend, a control of the aforementioned steps S12 to S18 is carried out, thereby preventing an occurrence of a shock derived from differences of the time constants between the engine 2 and the motor 3 when the front and rear wheel drive vehicle 1 is in the front and rear wheel driven mode.

As a result of the determination at Step S8 and Step S10, when the current engine target driving force and the current motor target driving force are both increasing with respect to the preceding engine actual driving force command value and the preceding motor actual driving force command value, or as a result of the determination at Step S8 and Step S9, when the current engine target driving force and the current motor target driving force are both decreasing with respect to the preceding engine actual driving force command value and the preceding motor actual driving force command value, viz. in an instance where increment/decrement of the target driving force of the engine 2 and the target driving force of the motor 3 express the same trend, the engine 2 and the motor 3 are controlled with the driving force command values associated with the respective time constants of the engine 2 and the motor 3.

In this event, the change amount ΔENG of the engine target driving force and the change amount ΔMOT of the motor target driving force associated with the respective change amounts of the engine driving force command value and the motor driving force command value are divided by the sampling intervals TE and TM based on the time constant of the engine 2 and the time constant of the motor 3, respectively, to thereby obtain the engine slope control step value ENG_S and the motor slope control step value MOT_S. Subsequently, the change amount ΔENG of the engine target driving force is divided by the engine slope control step value ENG_S to obtain a control value per one step, that is, the engine driving force command value ENG_S_F associated with the change amount ΔENG of the engine target driving force. At the same time, the change amount ΔMOT of the motor target driving force is divided by the motor slope control step value MOT_S to obtain a control value per one step, that is, the motor driving force command value MOT_S_F associated with the change amount ΔMOT of the motor target driving force. Finally, the resulting ENG_S_F is added and outputted to the output control section of the engine 2, that is the actuator 25 for actuating the throttle valve 24, and the resulting MOT_S_F is added and outputted to the motor drive circuit 26, in the order of sampling, thereby improving the response of the whole vehicle during the front and rear wheel driven mode.

Accordingly, in an instance where the engine driving force command value and the motor driving force command value are both increasing or decreasing, and for example when the driving forces of both engine 2 and motor 3 rise at a time of 4WD starting, ECU 12 does not adapt the motor driving force command value, that is based on the time constant of the motor driving force command-side, for the engine, and independently sets the motor driving force command value on the basis of the accelerator opening degree, the vehicle speed and the vehicle angle and a desired fuel consumption, thereby substantially improving the response of the vehicle 1. On the contrary, in an instance where the engine target driving force is increasing and the motor target driving force is decreasing, for example when in the regeneration mode to charge electricity with respect to the battery 8, or in an instance where the engine target driving force is decreasing and the motor target driving force is increasing, for example when the driving force of the motor 2 is relatively decreasing with respect to the driving force of the motor (or vise versa) with the driving force distribution ratio of the engine 3 gradually increased against the driving force distribution ratio of the motor 3 as a, result of increasing the vehicle speed while retaining a constant accelerator opening degree during the city area running mode for decreasing the amount of the exhaust gas and the engine noise, it is possible to prevent an occurrence of a shock derived from differences of the time constants between the engine 2 and the motor 3.

While the invention has been described in detail and with reference to a specific embodiment thereof, it will be apparent to one skilled in the art that various changes and modifications can be made therein without departing from the spirit and scope thereof. For example, it is possible to approximate the driving force of the motor 3 to the driving force of the engine 2 further by way of decreasing the sampling interval and thereby increasing the number of sampling.

What is claimed is:

1. A front and rear wheel drive vehicle having a front wheel pair and a rear wheel pair, one of which is driven with an engine and the other one of which is driven with a motor, comprising:

means for setting a target engine driving force of the engine based on driving conditions of the vehicle;

means for setting a target motor driving force of the motor based on driving conditions of the vehicle; and means for incrementally controlling a rate of change from an actual engine driving force toward the target engine driving force, and a rate of change from an actual motor driving force toward the target motor driving force, wherein said incremental control occurs when the target engine driving force increases and the target motor driving force decreases or when the target engine driving force decreases and the target motor driving force increases, wherein when an engine slope control step value based on a sampling interval of the change in the target engine driving force is equal to or lower than a motor slope control step value based on a sampling interval of the change in the target motor driving force, an engine control value equal to the change amount of the target engine driving force divided by the motor slope control step value is incrementally added to an actual engine driving force command value to control the rate of change from the actual engine driving force toward the target engine driving force, and wherein when the engine slope control step value is greater than the motor slope control step value, a motor control value equal to the change amount of the target motor driving force divided by the engine slope control step value is incrementally added to an actual motor driving force command value to control the rate of change from the actual motor driving force toward the target motor driving force.

2. A front and rear wheel drive vehicle according to claim 1, wherein the sampling interval of the change in the target engine driving force and the sampling interval of the change in the target motor driving force are determined according to a time constant of the engine and a time constant of the motor, respectively.

3. A front and rear wheel drive vehicle according to claim 2, wherein the time constant of the motor is increased in conformity with response characteristics of the engine.

4. A front and rear wheel drive vehicle according to claim 1, wherein the motor control value becomes smaller than a predetermined change amount.

* * * * *